(No Model.) 2 Sheets—Sheet 1.
E. E. WHIPPLE.
HARROW.
No. 360,939. Patented Apr. 12, 1887.
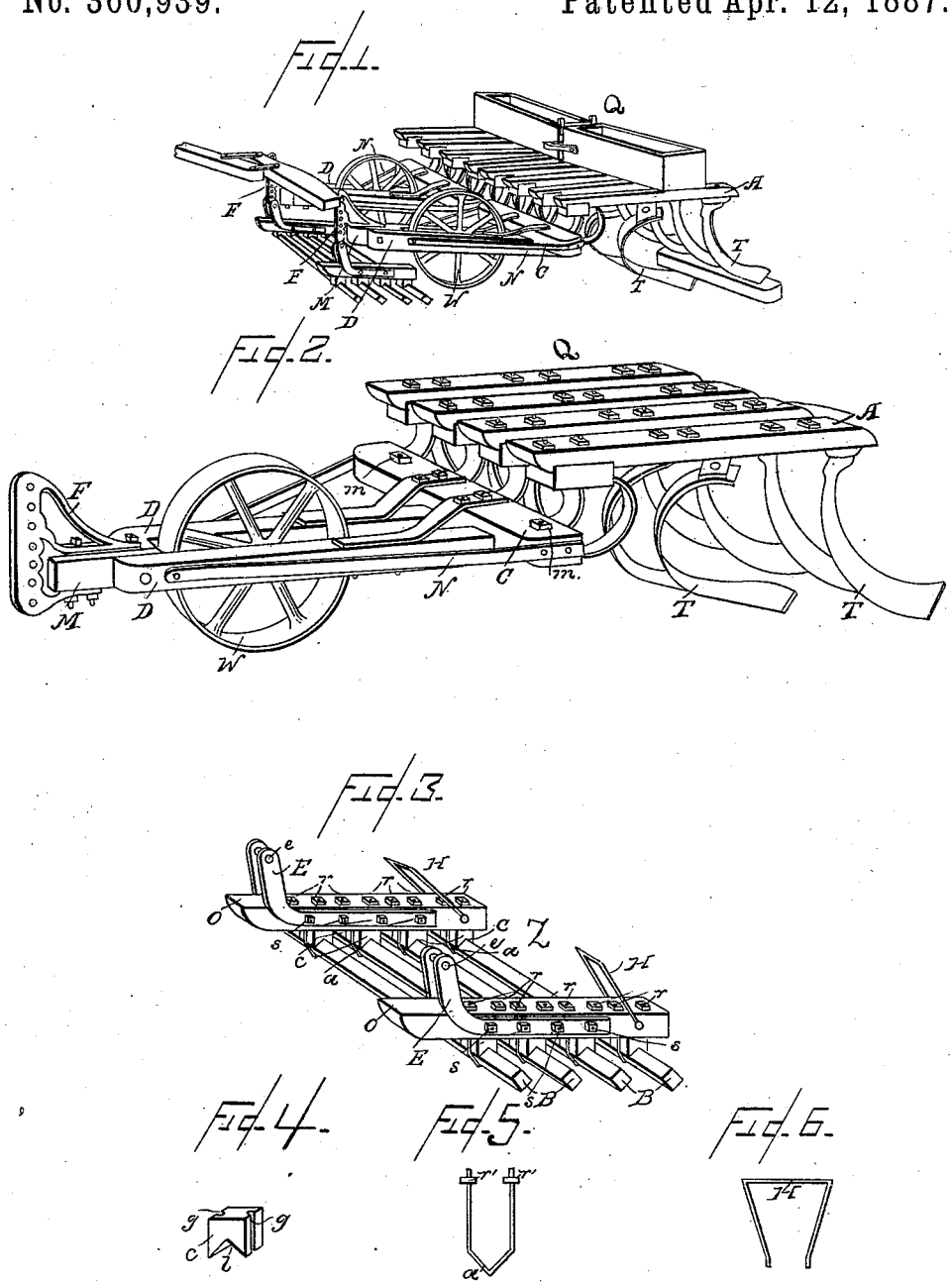
WITNESSES.
Norris A. Clark.
I. C. Jennings
INVENTOR.
Effinger E. Whipple
by Huggett & Smith
his attys (No Model.) 2 Sheets—Sheet 2.
E. E. WHIPPLE.
HARROW.

No. 360,939. Patented Apr. 12, 1887.

WITNESSES:
INVENTOR
Effinger E Whipple
by Huggin & Smith
his Attys

N. PETERS. Photo-Lithographer, Washington, D. C.

UNITED STATES PATENT OFFICE.

EFFINGER E. WHIPPLE, OF EATON RAPIDS, MICHIGAN.

HARROW.

SPECIFICATION forming part of Letters Patent No. 360,939, dated April 12, 1887.

Application filed December 2, 1886. Serial No. 220,433. (No model.)

*To all whom it may concern:*

Be it known that I, EFFINGER E. WHIPPLE, a citizen of the United States, residing at the city of Eaton Rapids, in the county of Eaton and State of Michigan, have invented new and useful Improvements in Harrows, of which the following is a specification.

My invention relates to improvements in harrows in which a float for crushing and pulverizing the lumps and clods precedes the teeth; and the objects of my improvements are, first, to properly level the ground and pulverize the lumps before the ground is passed over by the teeth; second, to present a level surface for the teeth to work in; third, to diminish the draft necessary to harrow the ground; fourth, to readily adjust the draft either for two or three horses, and, fifth, to provide a device for lessening the labor in better preparing the ground for planting. I attain these objects by the mechanism illustrated in the accompanying drawings, in which—

Figure 7:
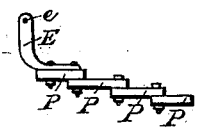
Figure 8:
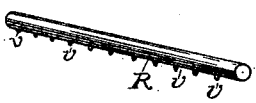
Figure 9:
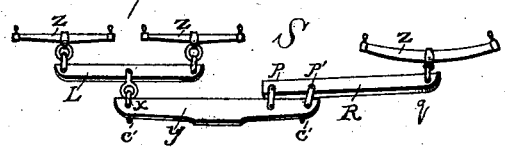
Figure 10:
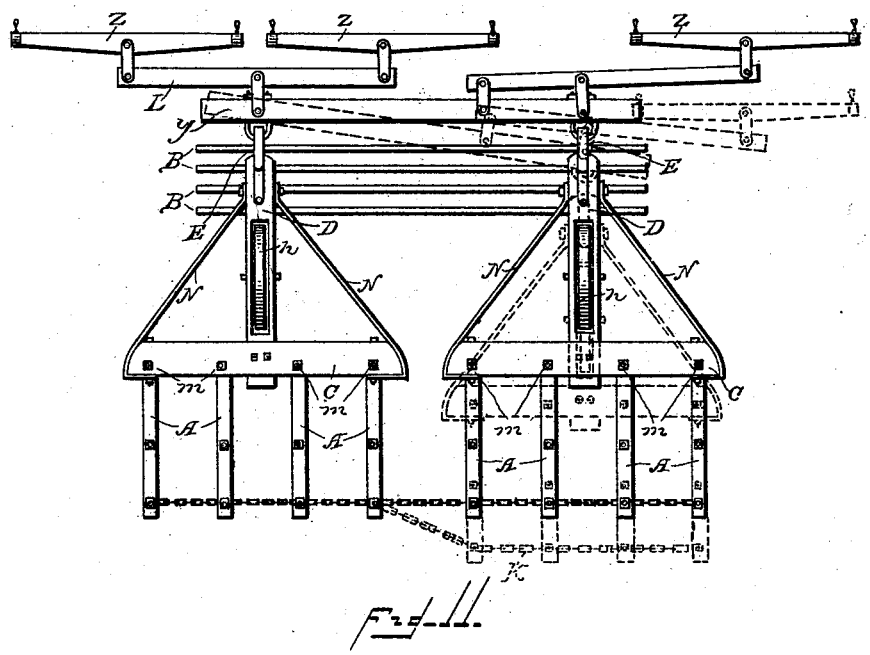
Figure 11:
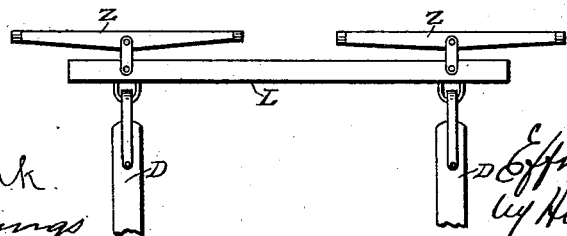

Figure 1 is a view in perspective of the harrow ready for operation. Fig. 2 is a half-section of my harrow carrying the teeth. Fig. 3 is the float. Fig. 4 is the grip. Fig. 5 is the clip. Fig. 6 is the guard. Fig. 7 is a sectional view of a float to take the place of Fig. 3, if preferred. Fig. 8 is a round bar. Fig. 9 is a three-horse evener. Fig. 10 is a top or plan view of the harrow, and Fig. 11 is the two-horse attachment.

Similar letters refer to similar parts throughout the several views.

The drag Q, the float Z, and the eveners S constitute the independent sectional parts of my device.

The drag Q, Fig. 2, is constructed of the beams A A A A, set with the teeth T T T and connected to the transverse bar C. The beam D D incloses the wheel W and the projection M, to which is bolted the graduated clevis F.

The float Z, Fig. 3, is comprised of any desirable number of parallel bars, B B B B, securely and rigidly bolted to the cross-bars O O near the ends.

The bars B B B are preferably square bars of iron, so set that the edges will be perpendicular to the ground; but good hard wood may also be used. The bars B B B B are held in position by being bolted to the bars O O with the clips *a a a a*, which are bent circular or diamond shape at one end, while at the other threads are cut for receiving the bolts *r r*. Between the bars B B B B and the bars O O is a block or grip, *c*, made of wood or iron, having a square cut, *e*, in one side for receiving and holding the bars B B B B and two grooves, *g g*, in the sides for receiving the clip *a*, as shown in Fig. 4.

The bars O O are constructed of wood, long enough to admit of any desired number of the bars B B B B, and have holes bored vertically through them for receiving the clips *a a a a*. Upon the sides of the bars O O are bolted iron side pieces, E E, the ends of which are bent upward and have slots *e e*. At the rear end of the bars O O are bolted two guides, H H, Fig. 6, being a bar of iron bent in a triangular shape with an opening sufficiently large at one of the angles to admit the bar O or O. Instead, however, of using the float Z, Fig. 3, any number of planks can be bolted together, presenting their edges to the surface of the ground, as shown in Fig. 7; or, instead of using the square iron bars B B B B, a round bar of iron or wood, R, may be set with spuds *v v v v*, as shown in Fig. 8.

I do not wish to confine myself strictly to the particular kind of a float specified in Fig. 3 or hereinbefore described, as in a variety of ways a device might be constructed for breaking or pulverizing the lumps and leveling the ground, but specify such float as that intended by me to be used, as well as the most practical in describing and disclosing the principle herein sought to be established, of leveling and pulverizing and harrowing the ground by going once over it.

It frequently occurs that on hard rough ground it is found desirable to use three horses instead of two, and for that purpose, as a convenient part of my device, I use the three-horse evener S, Fig. 9.

The evener S is constructed by attaching any ordinary whiffletrees to one end of the evener Y. At the other end of the evener Y is attached the arm R, by means of the strap of irons *p p'*, through the detached end of which is bored a hole, *q*, at twice the distance from the center of the evener Y as is the hole *x*, where the whiffletrees are attached. By means of the arm R the three single-trees *z z z* are on the same straight line of draft; and neither horse has any advantage in being hitched ahead of the others.

The harrow is operated in two independent sections, as is shown in Fig. 10, held together by a rod or chain, K, and is so constructed as to possess an independent forward and backward as well as a lateral movement. When two horses are used, an ordinary set of whiffletrees, L, is used by hitching a horse directly in front of each section, as shown in Fig. 11.

A graduated clevis, F, is bolted to the forward end of the beam D, to admit the draft being hitched high or low in regulating the depth of the teeth T T T, or the weight placed on the float Z. Each one of the independent sections of the harrow is provided with a wheel, W, placed at any desired distance from the forward end, for the purpose of carrying the frame and forming the fulcrum, so that a high hitch has the effect of weighting down the float or crusher Z and elevating the teeth T T T, while a low hitch will raise the float Z and lower the teeth T T T. The float or crusher Z is bolted at each end to the clevises F F', after which the evener Y is also bolted to the same clevises F F' by small looped clevises c c, Fig. 9. By raising the yokes H H, the float Z will be held rigidly to the ground.

As another convenient means of using and operating my device, it will be observed that the same can be used in independent sections, as shown in Fig. 2, in which case the crusher or float Z will be attached behind the wheel W to the bar C by rigid braces; or, preferably, by circular bands of steel, one end of which is bolted to the bar C, then passes up over forward and back under the bar C in the form of one of the teeth T, and to the other or detached end is bolted the bars B B B, thereby giving to the bars B B B a free action or spring in passing over an uneven surface.

As each part and section of my device acts separate and independent vertically, laterally, and forward or backward, it is as well adapted to uneven and rough as to smooth and level ground.

Having thus described my invention, what I claim as new, and desire to secure by Letters Patent, is—

1. In harrows, the combination of the independent sections of the drags, connected in the rear with a chain or rod, and the clod-crusher having horizontal bars for crushing the clods, preceding the drag and attached thereto, substantially as described and set forth.

2. In harrows, the combination of the independent sections of the drag carrying the teeth, connected in the rear with a chain or rod, and a float or clod-crusher of planks bolted together or round bars with spuds attached to the forward end, substantially as set forth and described.

3. In harrows, the combination of a drag carrying the teeth, provided with a wheel for balancing the frame, a clod-crusher preceding the drag, either in front or behind the wheel, and a graduated clevis for adjusting the draft, substantially as set forth and described.

4. In harrows, the combination of the drag carrying the teeth, the float or clod-crusher, the graduated clevis, with the evener, having an arm, R, extending in advance and beyond the evener Y, substantially as set forth and described.

EFFINGER E. WHIPPLE.

Witnesses:
CHARLES S. COBB,
JAS. RUSHTON.